April 17, 1962    A. J. VAN DER MEER ETAL    3,030,492
HAND OPERATED SPLICER
Filed Sept. 14, 1959      2 Sheets-Sheet 1
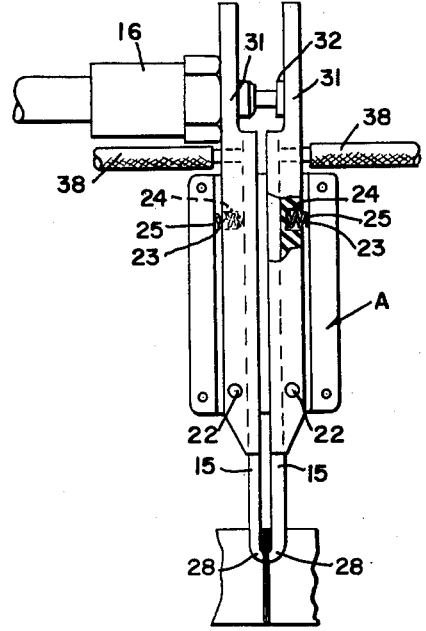
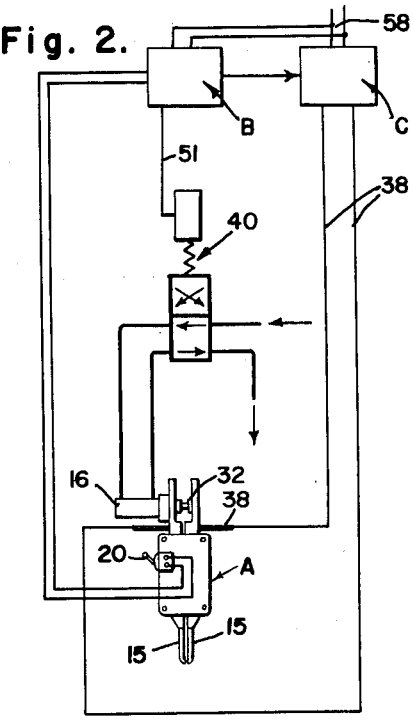
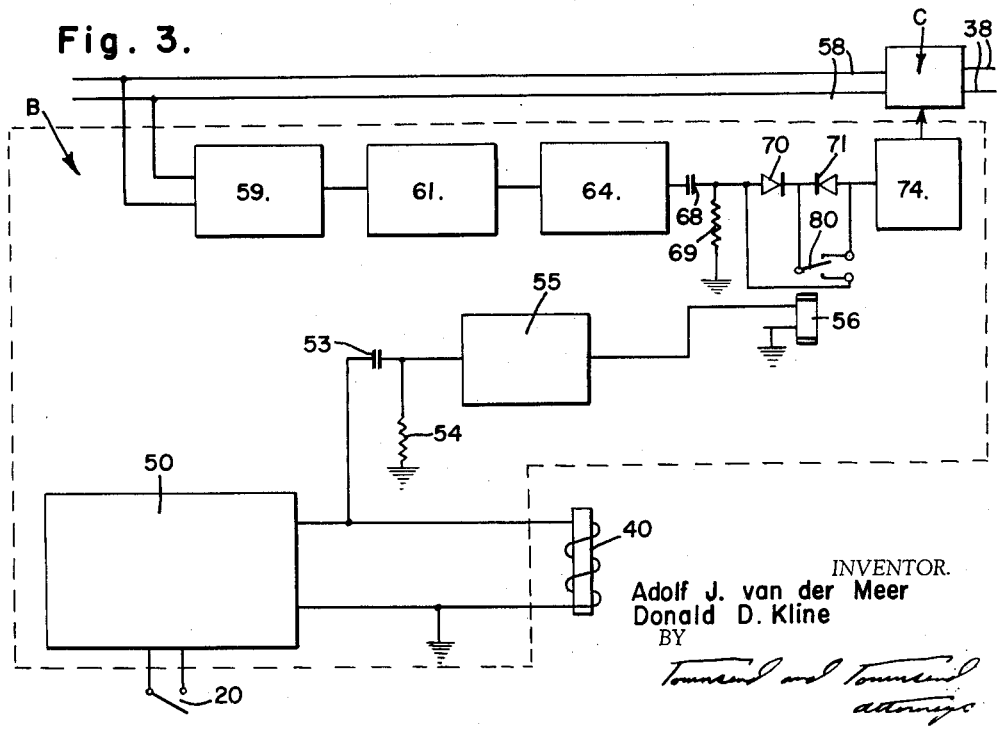
INVENTOR.
Adolf J. van der Meer
Donald D. Kline
BY

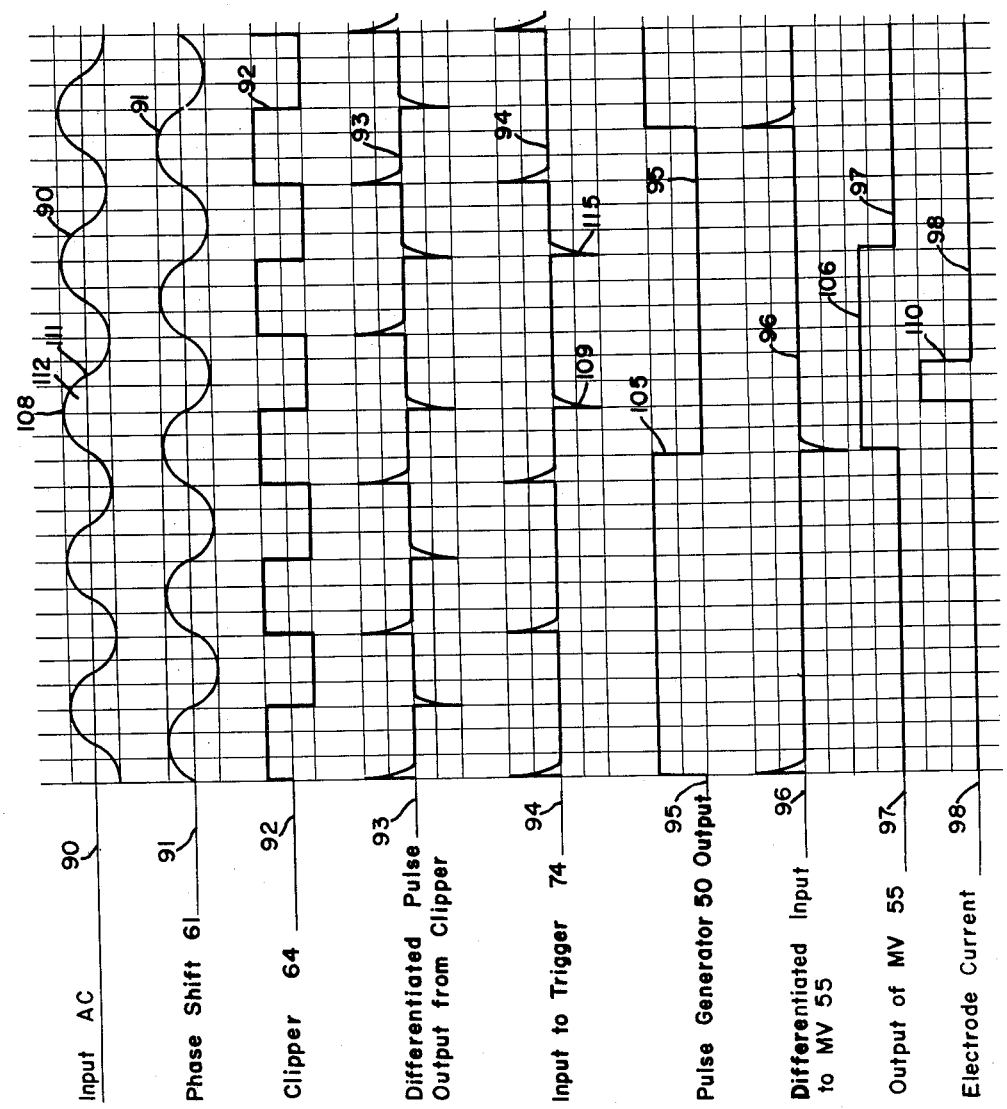

United States Patent Office 3,030,492
Patented Apr. 17, 1962

3,030,492
HAND OPERATED SPLICER
Adolf J. van der Meer and Donald D. Kline, Oakland, Calif., assignors to Hexcel Products Inc., Berkeley, Calif., a corporation of California
Filed Sept. 14, 1959, Ser. No. 839,800
7 Claims. (Cl. 219—89)

This invention relates to a hand operated welding device for resistance welding two pieces of sheet metal together.

More particularly this invention relates to a device for splicing together honeycomb portions of welded honeycomb or for correcting imperfectly welded joints.

The device is also useful in any resistance welding operation that requires a plurality of spot welds.

A principal object of this invention is to provide a hand operated device in which a pair of welding electrodes oscillate toward and away from one another with the work material sandwiched between the electrodes. The device also incorporates an electronic control mechanism that energizes the electrodes at the instant when the two electrodes are forcefully brought together.

A feature and advantage of this invention is that the freely oscillating electrode fingers allow the device to be moved to any position during all intervals except when the two electrodes are clamped together. The timing of the device is such that the clamping action occupies only a very short time interval so that even while the fingers or electrodes are in oscillation they may be moved freely about to position the fingers adjacent whatever section of the work that is necessary to be welded.

Another feature and advantage of this invention is that a simple electrical switch either mounted on a foot pedal or on the device carrying the electrodes themselves may be used to cause continuous reciprocation or oscillation of the fingers with concurrent electrical energization of the fingers when they are in the clamped position.

Another object of this invention is to provide an electronic timing device in which alternating current is fed to the timing device and switched to the electrodes at the proper phase time so that electrical current starts to flow at a time of high potential and throughout the cyclic interval to a point of substantially zero potential thus creating a cyclic period of welding energy starting at high intensity which decreases to zero.

A further feature and advantage of this invention is that the novel timing device allows a selected cyclic portion of an alternating current cycle to be applied to the electrodes each time the electrodes are moved to the closed position.

Another object of this invention is to provide a timing device in which a control circuit is arranged to open and close welding electrodes at cyclic intervals and a trigger pulse is arranged to energize the electrodes through a timing device which is triggered at the instant that the force holding the electrodes in the closed position ceases and in which the timing device is sufficiently fast so that the current surge is directed through the electrodes prior to actual release of pressure. In this way it is insured that the maximum pressure differential between the electrodes is obtained.

A further feature and advantage of this invention is that the inertia necessarily required in pneumatically operated mechanical devices is utilized to the extent that the electrical energy is applied at the time that the pneumatic mechanism is started in operation to release the electrodes and thus energizes the electrodes prior to the time that the fingers actually start to move.

A still further object of this invention is to provide a hand held device having a pair of welding fingers mounted within the device and having an electrical circuit connected to cause the fingers to oscillate toward and away from one another while simultaneously energizing the fingers with electrical energy at the time the fingers are closed.

Other objects of the present invention will become apparent upon reading the following specification and referring to the accompanying drawings in which similar characters of reference represent corresponding parts in each of the several views.

In the drawings:

FIGURE 1 is a sectional view of the hand held welding electrodes.

FIGURE 2 is a diagrammatic view showing the broad electrical and pneumatic circuitry.

FIGURE 3 is a block diagram showing in greater detail a portion of the electrical timing circuit for the device.

FIGURE 4 is a timing chart showing the relative time phase relationships of the various components forming the principal embodiment of this invention.

The principal embodiment of this invention comprises a hand held body A which pivotally carries a pair of fingers or electrodes 15 and a pneumatic motor 16 which functions to oscillate electrodes 15 toward and away from one another.

An electronic timing device B is arranged to control a power source C so as to cause the switching of electrical energy to electrodes 15 at times when the electrodes are in the closed position. Timing device B also controls pneumatic motor 16 to cause the oscillation of electrodes 15. A switch 20 mounted on body A switches timing device B into an operating condition.

Electrodes 15 are pivotally mounted about pivot points 22 carried in body A. Springs 23 are mounted in recesses 24 of each electrode 15 and are biased against the inner wall 25 of body A to force or urge the electrodes' tips 28 in spaced apart positions.

The entire body A is formed of a nonconductive material so that it may be safely hand held.

Pneumatic motor 16 is arranged on the upper portion of electrodes 15 as at 31. The body of the pneumatic motor is rigidly mounted on one of the electrodes 15 and the piston rod 32 is mounted on the other of the two electrodes.

When pneumatic power is applied to motor 16 the piston rod 32 moves outwardly forcing the rear ends of the electrodes apart and the working tips 28 together. When pneumatic pressure is released, the springs 23 return the working tips to an open or neutral position.

The pneumatic motor may be of the double acting type wherein the return can be by air pressure in addition to the biasing function of spring 23 should faster and more positive opening be required.

Switch 20 is mounted on the outside surface of body A in a position to be easily thumb actuated in order to start or stop operation of the device. If desired, a foot actuated floor switch could be substituted for switch 20.

Electrical current is supplied to the respective electrodes through lines 38 which connected to the rear portion of the electrodes and to welding power source C.

Pneumatic motor 16 is operated by a solenoid actuated valve 40 which when energized will cause motor 16 to be in operation and when de-energized will cause the valve to reverse to cause the opening of the electrodes 15.

Control device B includes a square wave generator 50 controlled by switch 20 so that when switch 20 is closed square wave generator 50 will emanate pulses connected to solenoid control valve 40 through line 51. This causes the repetitive opening and closing of the valve in accordance with the square wave output.

Square wave generator 50 should be adjustable so that the frequency of pulses can be varied to effect the rate of action of electrodes 15. The square wave output from square wave generator 50 is also applied through a differentiating circuit including a capacitor 53 and a resistor 54 arranged to provide a positive spike at the beginning of each pulse from square wave generator 50 and a negative spike at the end of the pulse. The spike output is applied to a one shot multivibrator 55 which is responsive to issue a pulse of from 8 to 16 milliseconds duration when triggered by the negative spike.

The pulse from multivibrator 55 actuates a relay 56 which causes the subsequent connection of power to electrodes 15. The precise timing of the trigger pulse to the welding power source C is controlled by a timing circuit phase responsive to the alternating current input to welding power source C.

To obtain this condition the alternating current line 58 is applied to a control circuit including a line filter 59 constructed to filter the alternating current to remove transients therefrom and is fed to a phase shifting circuit 61 constructed to shift the phase of the alternating current approximately 90°. The phase shifting circuit 61 may be of any conventional design and can be made adjustable if greater control of the welding pulse is desired. The output from the phase shifter 61 is then fed to a clipper or square amplifier 64 which converts the A.C. signal into a substantially square or rectangular wave form. The output from clipper 64 is then, in a differentiated circuit including a condenser 68 and a resistor 69, converted to negative and positive pulses or spikes indicative of either the beginning or the end of a square wave pulse output from the clipper 64.

The spike output is then fed through a pair of diodes 70 and 71 connected in serial back to back relationship to a Schmidt trigger circuit 74. The Schmidt trigger is a type of circuit which when receiving pulses of one polarity, for example positive pulses, will arm the trigger in a condition wherein upon receipt of the first negative pulse the trigger will issue the pulse of its own and thereafter will not issue an additional pulse until the trigger is again re-armed by a positive pulse followed by a subsequent trigger pulse.

The output of the Schmidt trigger is fed directly to the welding control circuit C which contains an electronic switch such as a thyratron or a silicon controlled rectifier. These devices are characterized by being immediately conductive to supply welding energy from power source 58 to electrodes 15 when they are in receipt of a trigger pulse from the Schmidt trigger and will become non-conductive when the supply voltage from alternating current 58 drops to approximately zero.

The spike output from the differentiating circuit including condenser 68 and resistor 69 is controlled by contact points 80 of relay 56 in such a way that either diode 70 or 71 is bypassed in accordance with the condition of relay 56. Thus, normally contacts 80 are in position to bypass diode 71 which will allow the positive pulses to pass through diode 70 to the Schmidt trigger. When relay 56 is energized relay contact points 80 will bypass diode 70, thus allowing only the negative pulses to be transmitted to Schmidt trigger 74. Thus, after a positive pulse has been transmitted to Schmidt trigger 74, if relay 56 is energized for a sufficient duration to allow one of the negative pulses from clipper 64 to pass to the Schmidt trigger 74 the Schmidt trigger will fire and cause the simultaneous energization of electrodes 15 through power source C.

The timing is seen on the graph of FIGURE 4 where indicated at 90 is the alternating current on line 58 which supplies both the timing device B and the welding power source C. Line 91 indicates the phase shift created by phase shifter 61. Line 92 indicates the square wave output from clipper 64. Line 93 indicates the spike output created through differentiating circuit of condenser 68 and resistor 69. Line 94 indicates the input to Schmidt trigger 74 through diodes 70 and 71. Line 95 indicates the output of square wave generator 50. Line 96 indicates the spike input from the differentiating circuit comprising condenser 53 and 54 to the one shot multivibrator 55. Line 97 indicates the output of the one shot multivibrator 55. Line 98 indicates the time interval that welding supply circuit C is connected to energize the electrodes 15.

It can thus be seen that the normal phase output from phase shifter 61 is 90° out of phase relative to the supply current and that a positive spike output to the Schmidt trigger occurs at either the extreme positive or negative swing of the input A.C. current depending upon the condition of relay contact points 80 of relay 56.

Normally the relay is in such a condition that only positive spikes appear so that the Schmidt trigger is armed but not operated. The square wave output from square wave generator 50 causes the solenoid valve 40 to actuate to cause the closing of electrodes 15. At the end of the pulse as indicated at 105 at line 95 the current to the solenoid valve 40 is released and a pulse occurs as shown by line 96 to the one shot multivibrator 55. The solenoid actuated valve 40 actuates a mechanical valve, the valve in turn changes the direction of air flow and the air flow operates pneumatic motor 16 to cause a physical movement of electrode 15, therefore there is an accumulative mechanical inerta which causes a time delay substantially in excess of 16 milliseconds prior to the release of any pressure between electrodes 15. The one shot multivibrator is arranged to provide a pulse output which is at least as long as a cyclic interval for the alternating current supplied so that during the time that the multivibrator is issuing a pulse at least one negative spike will occur to the Schmidt trigger 74. In the case of 60 cycle current, the one shot multivibrator 55 should issue a pulse of 8 milliseconds to approximately 16 milliseconds in duration. During the time that the one shot multivibratort is issuing a pulse as seen at 106 at line 97, relay 56 is energized to cause switch contact 80 to close so that subsequently when the alternatintg current reaches a positive polarity as indicated at 108 at line 90 a negative spike 109 on line 94 will appear which will cause the Schmidt trigger to issue a trigger pulse which will connect the alternating current through power source C to the electrodes as indicated at 110 at line 98. When the alternating current thence drops to approximately zero as at 111 the welding supply device C will disconnect the alternating current to the electrodes.

It can thus be seen that the welding electrodes 15 will be fed energy when the electrodes are in the compressed condition. The pulse originates at approximately the maximum swing of the A.C. and terminates at the minimum thus giving a pulse having a waveform which is consistent in magnitude, form and duration.

Should a subsequent negative pulse such as indicated at 115 of line 94 appear to the Schmidt trigger prior to the time relay 56 is de-energized, the pulse would be ineffective in that the Schmidt trigger will issue a trigger pulse only upon receipt of the first negative pulse after a positive pulse. When relay 56 is again de-energized, positive pulses are again fed to the Schmidt trigger to re-arm the trigger and the device is ready for repetitive operation.

The frequency of square wave generator 50 should be slow enough to allow for recovery of the welding electrodes 15 to their open position prior to the time of subsequent energization.

It can be seen that the device is substantially automatic requiring only that switch 30 be energized to cause the subsequent opening and closing of electrodes 15 and upon each closing of the electrodes the electrodes are energized with a single pulse of consistent controlled wave form prior to opening.

It can also be seen that the time that electrodes 15 will remain in the closed condition is determined by the duration of the pulses from pulse generator 50 and the rate of oscillation of the electrodes is determined by the frequency of the square wave output from pulse generator 50. Thus by providing an adjustment of both the frequency and the operating pulse integral of the pulse output from pulse generator 50 a control of both the rate and the time of closure of the electrodes 15 can be adjusted.

Although the foregoing invention has been described in some detail by way of illustration and example for purposes of clarity of understanding, it is understood that certain changes and modifications may be practiced within the sprit of the invention as limited only by the scope of the appended claims.

What is claimed is:

1. In a welding device the combination of: a pair of welding electrodes; means mounting said electrodes for movement toward and away from each other; motor means connected to said electrodes to open and close said electrodes; a pulse generator connected to said motor means to cause said motor means to open said electrodes upon being pulsed by pulses from said pulse generating means; welding current supply means to supply an alternating current; switch means to connect said welding current supply means to said welding electrodes; timing means connected to the current supply means responsive to the phase condition of the alternating current derived from said welding current supply means to cause said switch means to close at a predetermined phase condition of the alternating current; and control means connected to said pulse generating means and said timing means to cause said timing means to actuate said switch means after the termination of an energizing pulse to said motor means.

2. A welding device comprising: a pair of welding electrodes; mechanical means for moving said electrodes toward and away from each other in response to electrical pulse input; pulse supply means connected to said electrode moving means; alternating current supply means; switch means to connect said alternating current supply means to said welding electrodes; and timing means responsive to both the phase condition of said alternating current supply means and the pulse output from said pulse supply means to cause said switch means to close when the alternating current reaches a predetermined phase condition subsequent to a predetermined pulse condition output from said pulse supply means.

3. A device according to claim 2 and wherein said pulse supply means is responsive to cause said welding electrodes to close at the beginning of a pulse output and to open at the end of a pulse; said timing means being responsive to close said switch means after the termination of each pulse from said pulse generating means.

4. In a welding device the combination of: a pair of welding electrodes; means mounting said electrodes for movement toward and away from each other; motor means connected to said electrodes to open and close said electrodes; a pulse generator connected to said motor means to cause said motor means to open and close said electrodes upon being pulsed by pulses from said pulse generating means; welding current supply means to supply an alternating current; switch means to connect said welding current supply means to said electrodes; timing means connected to said welding current supply means; said timing means having means to cause said switch means to close at a predetermined phase condition of the alternating current derived from said welding current supply means; gate means connecting and disconnecting said timing means from operative engagement with said switch means; and control means connected to said pulse generating means and said gate means to open said gate means for a predetermined time after being pulsed by the trailing end of a pulse from said pulse generating means.

5. In a welding device the combination of: a pair of welding electrodes; means mounting said electrodes for movement toward and away from each other; motor means connected to said electrodes to open and close said electrodes; a pulse generator connected to said motor means to cause said motor means to open and close said electrodes upon being pulsed by pulses from said pulse generating means; welding current supply means to supply an alternating current; switch means to connect said welding current supply means to said electrodes; timing means connected to the current supply means responsive to the phase condition of the alternating current derived from said welding current supply means to issue trigger pulses at predetermined phase time relationships relative to the alternating current; control means connected to said pulse generating means to issue a control pulse having a time duration greater than the time required for the alternating current to complete one complete cycle; and gate means connected to said control means operable to open during the interval of said control pulse; said gate means connected to gate said trigger pulses to close said switch means.

6. A device according to claim 5 and wherein said trigger pulses are of an alternate polarity and said gate means is responsive to emit a trigger pulse to close said switch means upon receipt of only one pulse of a first polarity after having received a pulse of a second polarity.

7. In a welding device the combination of a welding head, a pair of welding electrodes pivotally mounted on said head for movement toward and away from each other, motor means on the opposite ends of said electrodes operable to move said electrodes together and apart, electrical means operable to energize said motor means to cause the opening and closure of said electrodes, pulse generating means operable to energize said electrical means to cause said electrodes to close during a pulse interval from said pulse generating means, welding current supply means connected to said electrodes, and switch means operable to supply a pulse of welding energy to said electrodes from said welding current supply means at the termination of a pulse from said pulse generating means, said motor means having sufficient inertia to delay the opening of said electrodes for an interval at least equal to the period of electrode energization at the termination of a pulse from said pulse generating means.

References Cited in the file of this patent

UNITED STATES PATENTS

| | | |
|---|---|---|
| 2,210,709 | Dawson | Aug. 6, 1940 |
| 2,363,753 | Smith et al. | Nov. 28, 1944 |